US012571447B2

(12) United States Patent
Mao et al.

(10) Patent No.: US 12,571,447 B2
(45) Date of Patent: Mar. 10, 2026

(54) MULTI-DIRECTIONAL BROADBAND TUNED MASS DAMPER AND DESIGN METHOD THEREOF

(71) Applicants: China Railway Major Bridge Engineering Group Co., LTD., Wuhan (CN); China Railway Bridge Science Research Institute, LTD, Wuhan (CN)

(72) Inventors: Weiqi Mao, Wuhan (CN); Xiaobo Wu, Wuhan (CN); Guoqiang Jing, Wuhan (CN); Xiaopeng Chai, Wuhan (CN); Jikai Tian, Wuhan (CN); Zhao Jin, Wuhan (CN); Bo Wang, Wuhan (CN); Zhengxing Wang, Wuhan (CN); Hao Dai, Wuhan (CN); Changfei Ma, Wuhan (CN); Qingnian Dai, Wuhan (CN); Long Xiao, Wuhan (CN); Pengfei Liu, Wuhan (CN); Nengjun Sheng, Wuhan (CN); Guanjun Cao, Wuhan (CN); Dingxin Wang, Wuhan (CN); Huan Feng, Wuhan (CN); Shuhui Tan, Wuhan (CN)

( * ) Notice: Subject to any disclaimer, the term of this patent is extended or adjusted under 35 U.S.C. 154(b) by 356 days.

(21) Appl. No.: 18/225,769

(22) Filed: Jul. 25, 2023

(65) Prior Publication Data

US 2024/0392856 A1 Nov. 28, 2024

(30) Foreign Application Priority Data

May 26, 2023 (CN) .......................... 202310607002.6

(51) Int. Cl.
*F16F 7/116* (2006.01)
*E01D 11/02* (2006.01)
(Continued)

(52) U.S. Cl.
CPC ................ *F16F 7/10* (2013.01); *E01D 11/02* (2013.01); *E01D 19/16* (2013.01)

(58) Field of Classification Search
CPC .. E01D 11/02; E01D 19/16; F16F 7/10; F16F 7/104; F16F 7/116
See application file for complete search history.

(56) References Cited

U.S. PATENT DOCUMENTS 3,314,503 A * 4/1967 Neubert .................. F16F 15/10
181/207
4,167,646 A * 9/1979 Mathieu ................... H02G 7/14
174/42

(Continued)

*Primary Examiner* — Thomas W Irvin
(74) *Attorney, Agent, or Firm* — Cahn & Samuels, LLP

(57) ABSTRACT

Disclosed are a multi-directional broadband tuned mass damper and a design method thereof, since a first damping structure and a second damping structure are set on a rigid vibration damping frame, and the first damping structure is provided with a control main frequency, the second damping structure is provided with two control main frequencies, the control main frequency of the second damping structure is greater than that of the first damping structure; under the synergistic effect, the second damping structure mainly effectively broadens the control range for high frequencies, and a plurality of first damping structures control the control main frequency of a low frequency one-to-one, thereby controlling the full frequency, and the extension direction of the first damping structure is the same as that of the second damping structure on the rigid vibration damping frame, ensuring isotropic mass and stiffness distribution characteristics thereof; and furthermore, when using different control frequency ranges, the number and distribution of the first damping structure and the second damping structure, as well as the corresponding mass ratio and damping ratio can be pre-designed, so as to adapt to different control requirements.

12 Claims, 10 Drawing Sheets

(51) Int. Cl.
    *E01D 19/16*         (2006.01)
    *F16F 7/10*         (2006.01)

(56)           References Cited

U.S. PATENT DOCUMENTS

| | | | | |
|---|---|---|---|---|
| 4,852,848 | A | * | 8/1989 | Kucera ................... F16F 7/104 |
| | | | | 188/380 |
| 9,121,321 | B2 | * | 9/2015 | Terrell .................... F01N 13/04 |
| 9,500,247 | B2 | * | 11/2016 | Song ....................... F16F 7/104 |
| 10,965,112 | B2 | * | 3/2021 | Crawford ................. F16F 7/10 |
| 11,353,081 | B2 | * | 6/2022 | Kranz ..................... F16F 7/116 |
| 2008/0308368 | A1 | * | 12/2008 | Gustavsson ............ F16F 7/104 |
| | | | | 188/380 |
| 2012/0103739 | A1 | * | 5/2012 | Song .................... F16L 55/041 |
| | | | | 188/378 |
| 2018/0316172 | A1 | * | 11/2018 | Barry .................... H02G 7/053 |
| 2019/0229512 | A1 | * | 7/2019 | Crawford ................ F16F 7/10 |
| 2021/0102594 | A1 | * | 4/2021 | Kranz ..................... F16F 7/116 |

* cited by examiner

MULTI-DIRECTIONAL BROADBAND TUNED MASS DAMPER AND DESIGN METHOD THEREOF

This patent application is a Paris Convention filing claiming priority to Chinese Patent Application No. 202310607002.6 filed on May 26, 2023, which is hereby incorporated by reference.

I. FIELD OF THE INVENTION

The present application relates to the technical field of vibration damping, in particular to a multi-directional broadband tuned mass damper and a design method thereof.

II. BACKGROUND OF THE INVENTION

The sling is the main connection and force transmission component of the stiffening beam and main cable of a suspension bridge. With the growing span of the suspension bridge, the characteristics of the sling, such as thin and long, small damping, and multiple vibration modes, are increasingly obvious. Under the action of external wind load and traffic load, various forms of vibration are prone to occur, such as vortex induced vibration, wake galloping, and parameter vibration. The slings of long-span suspension bridges are mostly double-suspended or multi-suspended arranged vertically in parallel, and the vibration is more complex and diverse than that of a single cable. From the point of view of the vibration mode, there are not only the vibration mode of the relative motion between the slings, but also the vibration mode of the synchronous motion between the slings. From the perspective of frequency, with the different external excitations, the combined vibration of a plurality of frequencies may occur in the sling. The continuous vibration of the sling may not only cause fatigue and corrosion at the anchorage end of the sling, seriously affect the service life and the cost of maintenance of the sling, but also cause pedestrians to question the safety of the bridge. Therefore, effective measures should be taken to control the vibration of the sling.

In some related technologies, the long-span suspension bridges that have been built have adopted the following structural control measures for different forms of the vibration of the sling. For example, aerodynamic measures of wound helixes, sling external dampers, rigid vibration damping frames, external pendulum lever dampers, impact mass dampers, and pendulum-type tuned mass dampers. The scheme of adopting rigid vibration damping frame for vibration reduction has the advantages of simple structure, low price, little impact on the landscape, and better control effect on wake galloping. However, the rigid vibration damping frame is only effective for the relative movement between the strands, and cannot effectively control the vibration of multiple slings in the same phase. Therefore, vibration damping measures are generally added to the original rigid vibration damping frame to effectively suppress the vibration of the sling, but there are still the following problems.

The additional vibration damping measures are generally to set up a tuned mass damper, which adjusts its own frequency through changing its own mass or stiffness to make it close to the frequency of the main structure. When the main structure vibrates, the vibration of the main structure is amplified and transmitted to the substructure through the principle of resonance, and this part of the vibration energy is dissipated through its own damping device.

Although the control frequency range can be effectively broadened through increasing the damping ratio and mass ratio, the broadening range is limited for low-frequency vibrations, and the broadband vibration damping of the long sling cannot be realized.

III. SUMMARY OF THE INVENTION

The embodiment of the present application provides a multi-directional broadband tuned mass damper and a design method thereof to solve the problem in the related art that although the control frequency range can be effectively broadened through increasing the damping ratio and mass ratio, the broadening range for low-frequency vibrations is still limited.

In a first aspect, a multi-directional broadband tuned mass damper is provided, which comprises a rigid vibration damping frame, and two ends of the rigid vibration damping frame in a length direction are configured to connect to a sling, wherein the rigid vibration damping frame is provided with several first damping structures and second damping structures distributed along the length direction at intervals, and the extension direction of the first damping structure is the same as that of the second damping structure; wherein the first damping structures are each provided with a control main frequency; the second damping structures are each provided with two control main frequencies; and the control main frequency of the second damping structure is higher than that of the first damping structure.

In some embodiments, there are a plurality of the first damping structures and the second damping structures; and the control main frequencies of the plurality of the first damping structures are different; and the two control main frequencies of each second damping structure are different, and the two control main frequencies of the plurality of the second damping structures are different.

In some embodiments, the first damping structures and the second damping structures are arranged on the rigid vibration damping frame according to the control main frequencies from large to small or from small to large.

In some embodiments, one second damping structure is provided between two adjacent first damping structures; or the rigid vibration damping frame is provided with a first area and a second area in the length direction, all the first damping structures are arranged in the first area, and all the second damping structures are arranged in the second area.

In some embodiments, the first damping structure comprises a first steel strand and a first mass block; one end of the first steel strand is connected to the rigid vibration damping frame by means of a connecting block, and the other end is connected to the first mass block; and a formula of the control main frequency of the first damping structure is:

$$f_1 = (K/M)^{1/2}/2\pi,$$

wherein K is the stiffness of the first steel strand, and M is the mass of the first mass block.

In some embodiments, the first mass block is provided with a first casting hole, and the part of the first steel strand extending into the first casting hole is connected to the first mass block by means of a first casting alloy in a casting manner.

In some embodiments, the second damping structure comprises a second steel strand, a second mass block, a first rigid tube and a third mass block; the second mass block is coaxially connected to the third mass block by means of the first rigid tube; a via hole is provided on the second mass block; one end of the second steel strand is connected to the third mass block through the via hole, and the other end is connected to the rigid vibration damping frame by means of a connecting block; and formulas of the two control main frequencies of the second damping structure are:

$$f_2 = [K/(M_1 + M_2 + M_3)]^{1/2}/2\pi;$$

$$f_3 = (T/M_2)^{1/2}/2\pi;$$

wherein K is the stiffness of the second steel strand, $M_1$ is the mass of the third mass block, and $M_2$ is the mass of the second mass block; and $M_3$ is the mass of the first rigid tube.

In some embodiments, the third mass block is provided with a second casting hole; and the part of the second steel strand located in the second casting hole is connected to the third mass block by means of a second casting alloy.

In some embodiments, the second damping structure comprises a second rigid tube and a third steel strand; a bottom part of the second rigid tube is provided with a sealing bottom plate; the third steel strand extends into the second rigid tube, and is connected to the second rigid tube by means of a fifth mass block; and a fourth mass block is coaxially, fixedly connected to an outside of the second rigid tube.

In some embodiments, the second damping structure comprises a second rigid tube and a third steel strand; a bottom part of the second rigid tube is provided with a sealing bottom plate; the third steel strand extends into the second rigid tube, and is connected to the second rigid tube by means of a fifth mass block; and a fourth mass block is coaxially, fixedly connected to an outside of the second rigid tube; a diameter of the sealing bottom plate is equal to an outer diameter of the fourth mass block, and the sealing bottom plate is connected to a bottom part of the fourth mass block by means of a third rigid tube.

In some embodiments, the fifth mass block is a third casting alloy that connects the second rigid tube and the third steel strand in a casting manner.

In some embodiments, the fifth mass block is provided with several water holes arranged along the length direction of the third steel strand; and the bottom part of the water hole passes through the sealing bottom plate.

In a second aspect, a design method for the multi-directional broadband tuned mass damper is provided, comprising the following steps:

obtaining the target range of the control frequency, and obtaining a plurality of target control main frequencies;

comparing the plurality of the target control main frequencies with a set control main frequency; if the target control main frequency is less than the set control main frequency, taking the target control main frequency as a design parameter of the first damping structure; otherwise taking as a design parameter of the second damping structure;

obtaining the number of the target control main frequency that is less than the set control main frequency; obtaining the number of the target control main frequency that is larger than or equal to the set control main frequency; and manufacturing the first damping structure and the second damping structure based on the design parameter and number of the first damping structure and the design parameter and number of the second damping structure, and installing on the rigid vibration damping frame.

In some embodiments, when the installation space on a single rigid vibration damping frame is less than the required installation space for all the first damping structures and second damping structures, a plurality of identical rigid vibration damping frames are additionally installed to install all the first damping structures and second damping structures on the sling.

The beneficial effects of the technical solution provided in the present application are as follows:

The present invention provides a multi-directional broadband tuned mass damper and a design method thereof, since a first damping structure and a second damping structure are set on a rigid vibration damping frame, and the first damping structure is provided with a control main frequency, the second damping structure is provided with two control main frequencies, the control main frequency of the second damping structure is greater than that of the first damping structure; under the synergistic effect, the second damping structure mainly effectively broadens the control range for high frequencies, and a plurality of first damping structures control the control main frequency of a low frequency one-to-one, thereby controlling the full frequency, and the extension direction of the first damping structure is the same as that of the second damping structure on the rigid vibration damping frame, ensuring isotropic mass and stiffness distribution characteristics thereof; and furthermore, when using different control frequency ranges, the number and distribution of the first damping structure and the second damping structure, as well as the corresponding mass ratio and damping ratio can be pre-designed, so as to adapt to different control requirements.

IV. BRIEF DESCRIPTION OF THE DRAWINGS

In order to better illustrate the technical solution in the embodiments of the present application, the following will briefly introduce the drawings discussed in the description of the embodiments, and it is obvious that the drawings in the following description are part of embodiments of the present application, for those of ordinary skill in the art, other drawings may also be obtained based on these drawings without any inventive effort.

Figure 1:
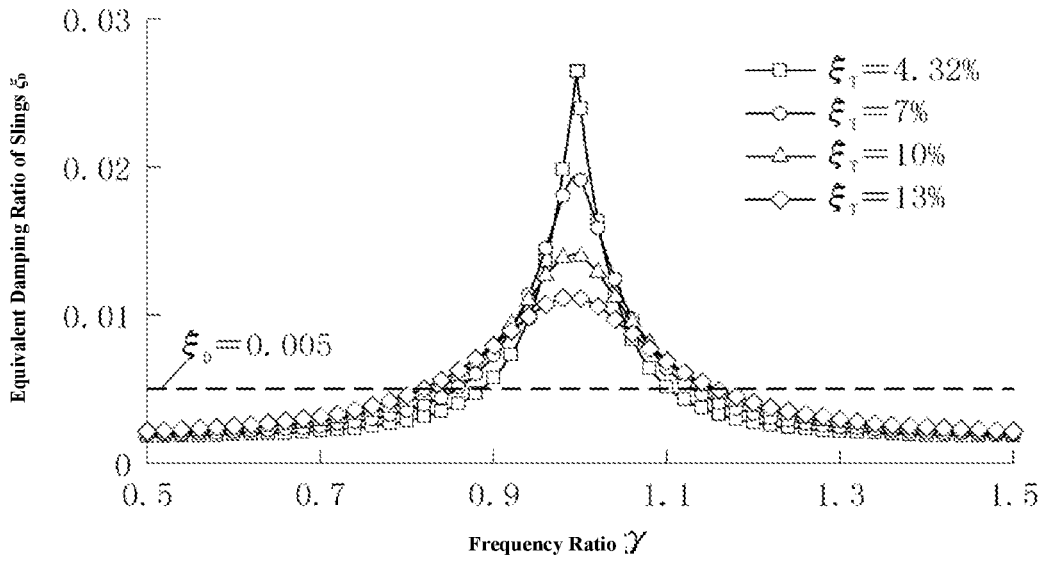
FIG. 1 is a schematic diagram of optimized damping parameters of a sling at a fixed mass ratio and different damping ratios for a damping structure in the related art.

In the figures: 1—rigid vibration damping frame; 2—the first damping structure; 200—the first steel strand; 201—the first mass block; 202—the first casting alloy; 3—the second damping structure; 300—the second mass block; 301—the first rigid tube; 302—the third mass block; 303—the second steel strand; 304—the second rigid tube; 305—the third steel strand; 306—the fourth mass block; 307—the third rigid tube; 308—sealing bottom plate; 309—the second casting alloy; 310—via hole; 311—the fifth mass block; 4—connecting block.

V. DETAILED DESCRIPTION OF THE EMBODIMENTS

In order to make the purpose, technical solutions and advantages of the embodiments of the present application clearer, the technical solutions in the embodiments of the present application will be described clearly and completely in combination with the drawings in the embodiments of the present application. Obviously, the described embodiments are only a part of the embodiments of the present application, not all of the embodiments. Based on the embodiments in the present application, all other embodiments obtained by a person of ordinary skill in the art without inventive efforts shall fall within the protection scope of the present application.

For why the present application is only improved for the rigid vibration damping frame, refer to the following explanations:

The sling of Akashi Kaikyo Bridge in Japan adopts the aerodynamic measure of winding spiral, which requires special theoretical analysis and wind tunnel test verification before the implementation of the vibration damping effect, and the applicability to the slings with different sizes and spacing is poor, so that it is inconvenient and costly to apply to bridges that have been in operation. The Great Belt Bridge in Denmark is installed with a sling external damper, which requires a special support and has high requirements on the stiffness and installation height of the support, which has a great impact on the bridge landscape. The rigid vibration damping frame scheme adopted by Xihoumen Bridge in China has effectively controlled the collision between the slings and suppressed the wake-induced vibration of the slings, but the spacing of the rigid vibration damping frame needs to be reasonably designed, and it is unable to provide damping for the sling, which has limited effect on the control of the same direction movement and out-of-plane vibration of the sling. The Nansha Bridge, Nizhou Waterway Bridge and Dasha Waterway Bridge in China have respectively adopted three kinds of dampers: external pendulum lever damper, impact mass damper and pendulum tuned mass damper, but the use conditions of various dampers and the frequency range of sling control are limited.

The use of rigid vibration damping frame has the advantages of simple structure, low price, little impact on the landscape, and better control effect on wake galloping, so the rigid vibration damping frame is taken as the research object. The following is a detailed introduction to the effects and defects of using a rigid vibration damping frame: taking double slings as an example, when the in-plane mode or out-of-plane mode of opposite phase occurs in the double sling, the rigid vibration damping frames installed at n equal division points of the sling can effectively constrain the displacement of the sling at both ends, equivalent to providing rigid constraints to the sling, changing the effective vibration length of the sling from L to L/n, changing the frequency of the sling to n times the original, and increasing the starting wind speed to n times the original, which can effectively reduce the probability of vibration of the sling. However, when the frequency of external wind load is close to the natural frequency of the sling, the in-plane mode or out-of-plane vibration of the same phase may occur in the double sling, at this time, the displacement and velocity of the beam end of the vibration damping frame installed at the n equal division points are consistent, the vibration damping frame does not play a role, and the vibration characteristics of the original sling are not changed. In addition, due to the fact that the vibration damping frame is a purely rigid component, it cannot provide structural damping for the double sling. Once the external excitation causes the sling to vibrate, the vibration state will last for a long time before slowly attenuating. Long-term continuous vibration will cause fatigue damage to the sling body, anchor head and rigid vibration damping frame.

Aiming at the defects of the rigid vibration damping frame, adding vibration damping measures are generally adopted, and adding vibration damping measures are generally to set up a tuned mass damper (TMD). The following is a practical analysis of a bridge with a long sling and broadband vibration to illustrate the problems we have found.

The bridge with the long sling and broadband vibration is Guangxi Longmen Bridge. The Guangxi Longmen Bridge is a double-tower single-span suspension bridge with a main span of 1098 m. The steel box girders of the main span extend 50 m to the side spans on both sides, the ratio of rise to span is 1:10, and the distance between the centers of the main cables cross the bridge is 33.8 m. The sling of the bridge adopts parallel steel wire slings wrapped with hot-extruded double-layer HDPE sheaths, with 2 slings set at each lifting point, and the standard spacing of the sling along the bridge direction is 12.8 m. The material of the sling is φ5.0 mm zinc-aluminum alloy-coated high-strength steel wire, and the standard tensile strength is ≥1770 MPa. The specification of the ordinary sling is 91-5, and the diameter of the sling is 69 mm; and the specification of the reinforced sling beside the tower is 241-5, and the diameter of the reinforced sling is 105 mm. There are 56 lifting points with a sling length of more than 50 m, and the longest sling length is 128.564 m.

The Longmen Bridge is located on the coast of Maowei Sea, where typhoons occur 2 to 5 times every year, with frequent gusts, and the long slings are prone to wind-induced vibration, so corresponding vibration reduction measures should be taken.

The fundamental vibrational frequency of the long sling over 50 m of the Longmen Bridge is 1.0-2.0 Hz, and the initial damping ratio of the parallel steel wire sling is about 0.16% (logarithmic attenuation rate is about 1%), the damping ratio required for vibration control is 0.5% (the logarithmic attenuation rate is greater than 3%), and the vibration control frequency of the sling is 0~30 Hz. Aiming at the insufficiency of the rigid vibration damping frame scheme, a tuned mass damper (TMD) is adopted to achieve vibration damping for slings longer than 50 m. The tuned mass damper adjusts its own frequency through changing its own mass or stiffness to make it close to the frequency of the main structure, when the main structure vibrates, the vibration of the main structure is amplified and transmitted to the substructure through the principle of resonance, and this part of the vibration energy is dissipated through its own damping device to achieve rapid attenuation of the vibration of the main structure.

To meet the target of the vibration reduction of the long sling of the Longmen Bridge, according to the classical TMD vibration reduction theory, the modal mass ratio μ of the TMD to the sling is selected for parameter optimization step by step, corresponding to the optimal frequency ratio of the TMD to the sling, the optimal damping ratio of the TMD, and the equivalent damping ratio of the sling. The optimization results are shown in Table 1. It can be seen from Table 1 that the additional damping ratio provided by TMD for the structure increases with the increase of the modal mass ratio, and a very small mass ratio (0.01%) can meet the vibration reduction requirements of the sling under the optimal parameters of the TMD (the damping ratio is greater than 0.5%).

TABLE 1

| Optimal Parameter Optimization Results of Sling-TMD | | | |
| --- | --- | --- | --- |
| Modal Mass Ratio μ | Optimal Frequency Ratio γ | Optimal Damping Ratio $\xi_T$ of TMD | Equivalent Damping Ratio $\xi_D$ of Sling |
| 0.01% | 0.9999 | 0.61% | 0.50% |
| 0.05% | 0.9995 | 1.37% | 0.93% |
| 0.10% | 0.9990 | 1.94% | 1.25% |
| 0.30% | 0.9970 | 3.35% | 2.07% |
| 0.50% | 0.9950 | 4.32% | 2.63% |
| 0.80% | 0.9921 | 5.46% | 3.29% |
| 1.00% | 0.9901 | 6.09% | 3.65% |
| 1.50% | 0.9852 | 7.44% | 4.44% |
| 2.00% | 0.9804 | 8.57% | 5.10% |

Note: The equivalent damping ratio of the sling=the initial damping ratio of the sling (0.16%)+the additional damping ratio of TMD.

In order to realize broadband control of the sling of the Longmen Bridge, two parameters, the damping ratio of the TMD and the modal mass ratio of a single TMD to the sling, are optimized. Taking the modal mass ratio of a single TMD and the sling as 0.50%, taking the damping ratios of the TMD as $\xi T1$=4.32% (optimum damping ratio), $\xi T2$=7.00%, $\xi T3$=10.00% and $\xi T4$=13.00%, respectively, the parameters of the damping ratio of the TMD are optimized, and the results are shown in FIG. 1. It can be seen from FIG. 1 that the smaller the damping ratio of the TMD, the narrower the coverage of the adjacent main frequency, which is not suitable for the multi-mode control of the sling; after increasing the damping ratio of the TMD to 10%, the frequency coverage increases, and can reach 83%-115% of the main frequency; while continuing to increase the damping ratio, the comprehensive effect is not obvious.

Figure 2:
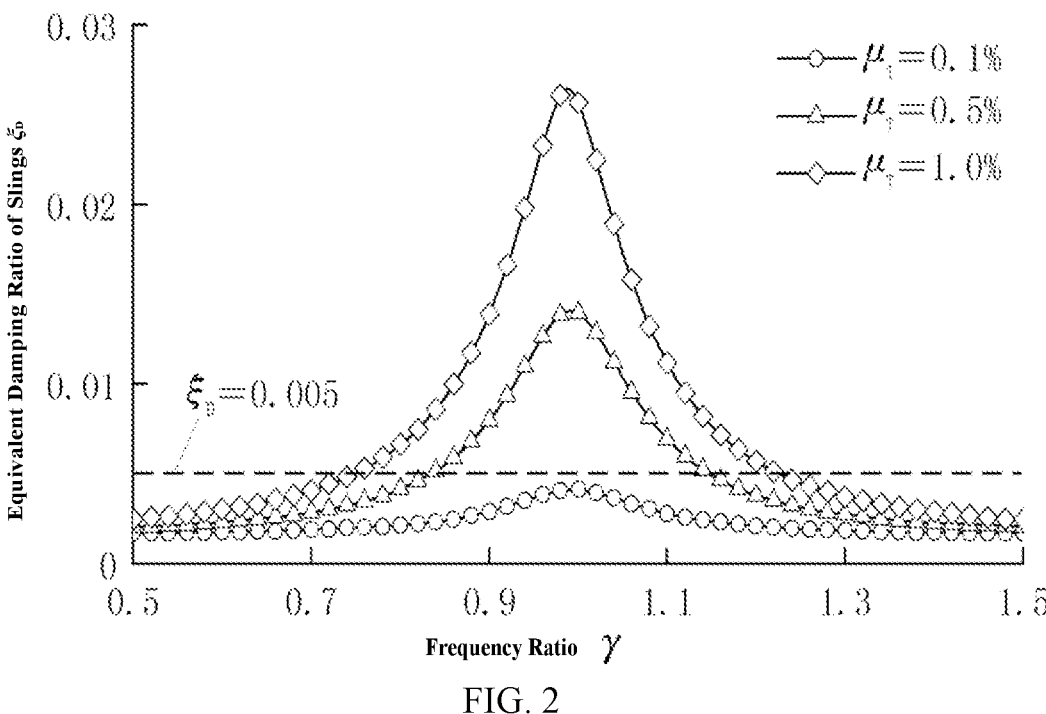
FIG. 2 is a schematic diagram of optimized damping parameters of a sling at a fixed damping ratio and different mass ratios for a damping structure in the related art.

The damping ratio of the TMD is taken as 10%, and the modal mass ratios of a single TMD to the sling is 0.1%, 0.5% and 1.0%, respectively, and the parameters are optimized for the modal mass ratio of a single TMD to the sling, and the results are shown in FIG. 2. It can be seen from FIG. 2 that when the damping ratio of the TMD is 10%, if the mass ratio is too small (such as 0.1%), the overall vibration reduction target cannot be achieved; and the larger the mass ratio, the wider the coverage of the adjacent main frequency, but the greater the control cost.

According to the above analysis, we found that through increasing the damping ratio and mass ratio of the TMD, the control frequency range can be effectively broadened, but the broadening range is limited for low-frequency vibrations.

Therefore, in summary, we provide the following settings for the above problems.

A multi-directional broadband tuned mass damper, which comprises a rigid vibration damping frame 1, and two ends of the rigid vibration damping frame 1 in a length direction are configured to connect to a sling; the rigid vibration damping frame 1 is provided with several first damping structures 2 and second damping structures 3 distributed along the length direction at intervals, and the extension direction of the first damping structure 2 is the same as that of the second damping structure 3; the first damping structures 2 are each provided with a control main frequency; the second damping structures 3 are each provided with two control main frequencies; and the control main frequency of the second damping structure 3 is higher than that of the first damping structure 2.

Under the synergistic effect, the second damping structure 3 mainly effectively broadens the control range for high frequencies, and a plurality of first damping structures 2 control the control main frequency of a low frequency one-to-one, thereby controlling the full frequency, and the extension direction of the first damping structure 2 is the same as that of the second damping structure 3 on the rigid vibration damping frame 1, ensuring isotropic mass and stiffness distribution characteristics thereof; and furthermore, when using different control frequency ranges, the number and distribution of the first damping structure 1 and the second damping structure 3, as well as the corresponding mass ratio and damping ratio can be pre-designed, so as to adapt to different control requirements. The first damping structure 2 and the second damping structure 3 are isotropic pendulum tuned mass dampers (PTMD). The extending direction can be interpreted as: refer to FIG. 4, the extending direction is extending along a straight line from top to bottom. The first damping structure 2 is not set randomly, and it needs to be designed according to the needs to control the main frequency and number.

In some preferred embodiments, the number of the first damping structures 2 and the number of the second damping structures 3 are also different according to different requirements for vibration reduction, and the following forms are given below:

In the first type, the number of the first damping structures 2 is one, and the number of the second damping structures 3 is one.

In the second type, there are a plurality of first damping structures 2 and second damping structures 3; the control main frequencies of the plurality of the first damping structures 2 are different; the two control main frequencies of each second damping structure 3 are different, and the two control main frequencies of the plurality of the second damping structures 3 are different.

The first damping structures 2 and the second damping structures 3 have the following arrangements:

Arrangement method one: the first damping structures 2 and the second damping structures 3 are arranged on the rigid vibration damping frame 1 according to the control frequency from large to small or from small to large.

Figure 5:
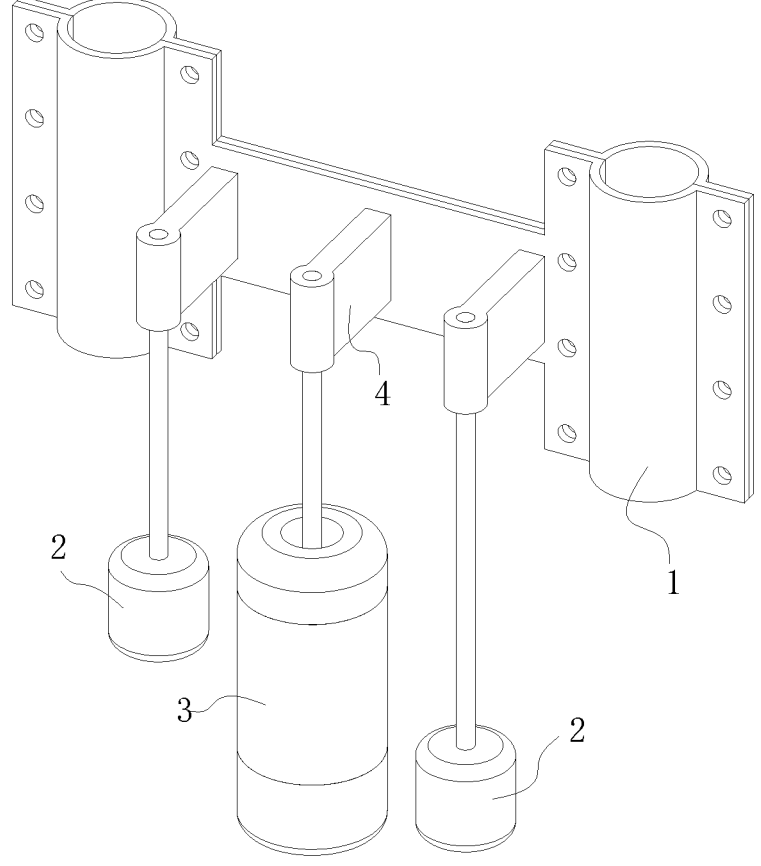
FIG. 5 is a structural diagram of a multi-directional broadband tuned mass damper in the embodiment of the present application.
Figure 6:
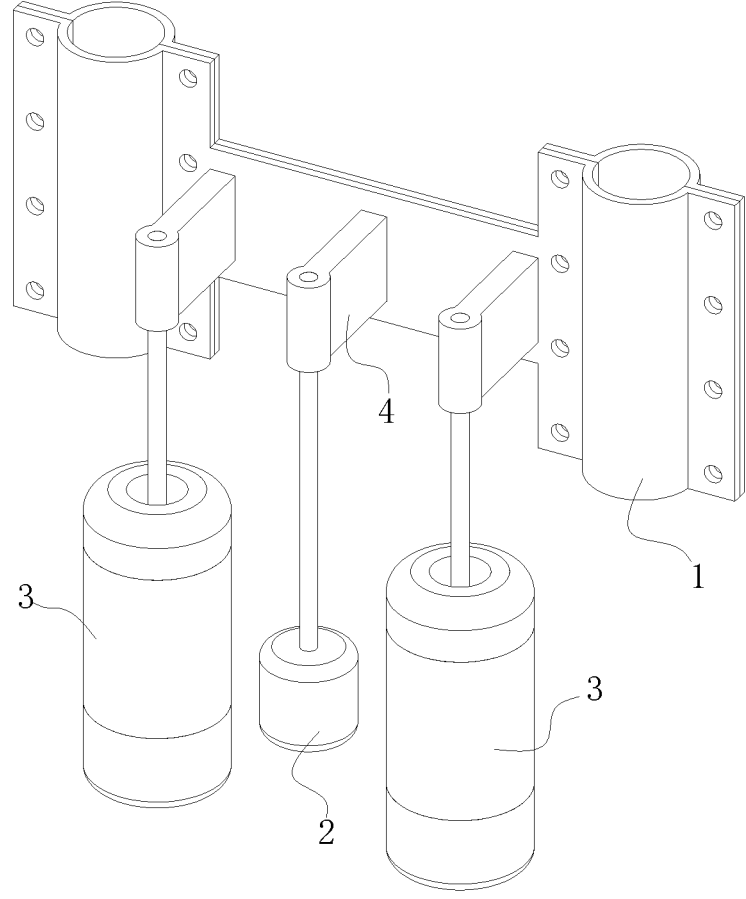
FIG. 6 is a structural diagram of another multi-directional broadband tuned mass damper in the embodiment of the present application.

Arrangement method two: a second damping structure 3 is provided between two adjacent first damping structures 2. Refer to FIG. 5 and FIG. 6.

Figure 15:
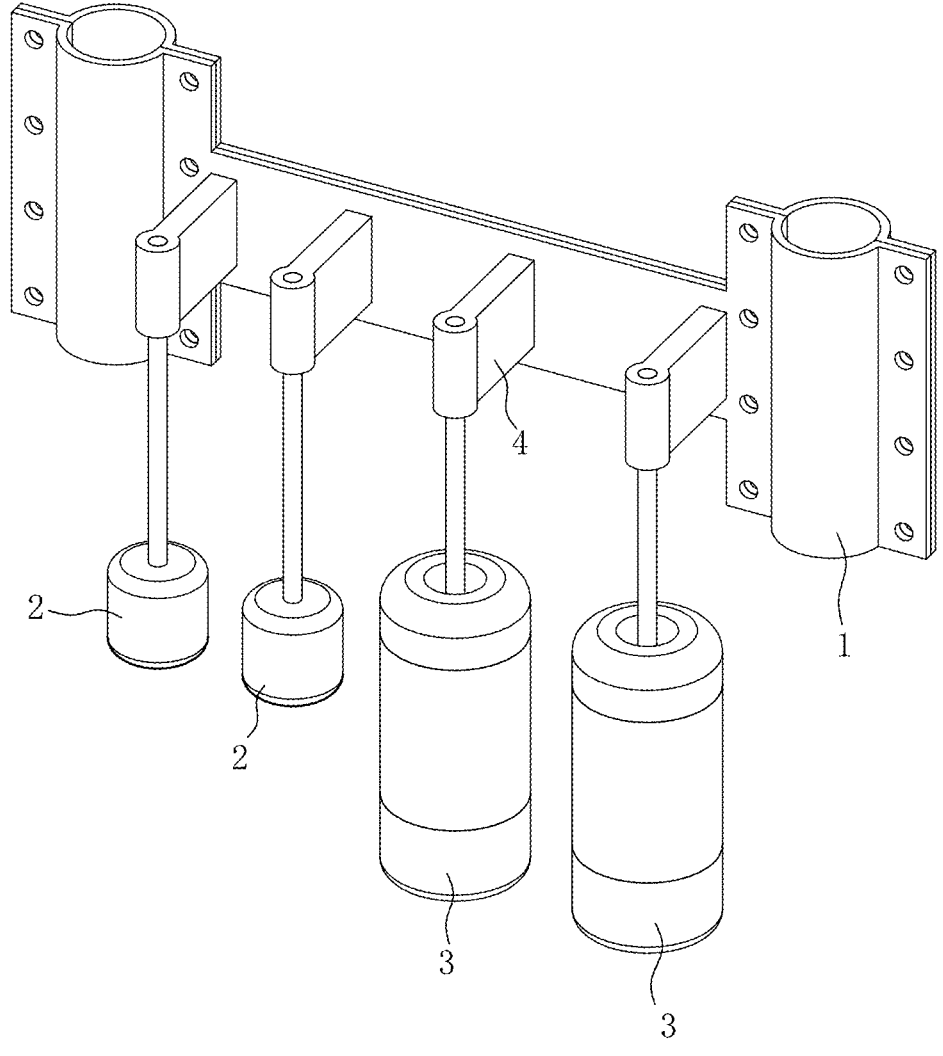
FIG. 15 is a structural diagram of another multidirectional broadband tuned mass damper in the embodiment of the present invention.

Arrangement method three: the rigid vibration damping frame 1 is provided with a first area and a second area in the length direction, all the first damping structures 2 are arranged in the first area, and all the second damping structures 3 are arranged in the second area. Refer to FIG. 15.

Figure 10:
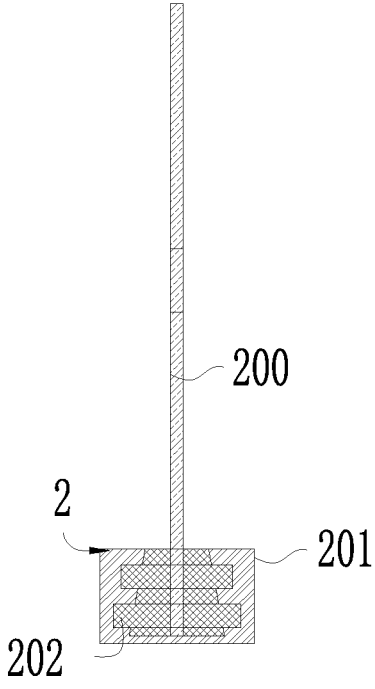
FIG. 10 is a schematic diagram of the first damping structure in the embodiment of the present application.

In some preferred embodiments, refer to FIG. 10, the first damping structure 2 comprises a first steel strand 200 and a first mass block 201; one end of the first steel strand 200 is connected to the rigid vibration damping frame 1 by means of a connecting block 4, and the other end is connected to the first mass block 201; and a formula of the control main frequency of the first damping structure 2 is:

$$f_1 = (K/M)^{1/2}/2\pi,$$

wherein K is the stiffness of the first steel strand 200, and M is the mass of the first mass block 201.

In order to facilitate the connection, the first mass block 201 is provided with a first casting hole, and the part of the first steel strand 200 extending into the first casting hole is connected to the first mass block 201 by means of a first casting alloy 202 in a casting manner.

Figure 9:
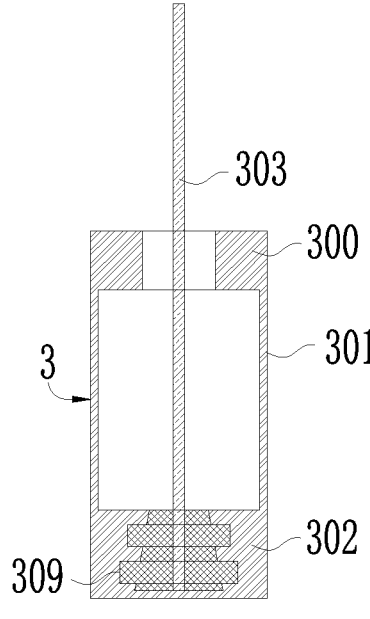
FIG. 9 is a schematic diagram of the second damping structure in the embodiment of the present application.

In some preferred embodiments, refer to FIG. 9, the second damping structure 3 comprises a second steel strand 303, a second mass block 300, a first rigid tube 301 and a third mass block 302; the second mass block 300 is coaxially connected to the third mass block 302 by means of the first rigid tube 301; a via hole is provided on the second mass block 300; one end of the second steel strand 303 is connected to the third mass block 302 through the via hole, and the other end is connected to the rigid vibration damping frame 1 by means of a connecting block 4; and formulas of the two control main frequencies of the second damping structure 3 are:

$$f_2 = [K/(M_1 + M_2 + M_3)]^{1/2}/2\pi;$$

$$f_3 = (T/M_2)^{1/2}/2\pi;$$

wherein K is the stiffness of the second steel strand 303, $M_1$ is the mass of the third mass block 302, $M_2$ is the mass of the second mass block 300; $M_3$ is the mass of the first rigid tube 301; the third mass block 302 is provided with a second casting hole; and the part of the second steel strand 303 located in the second casting hole is connected to the third mass block 302 by means of a second casting alloy 309. Such a structure is the PTMD structure in the related art.

Figure 8:
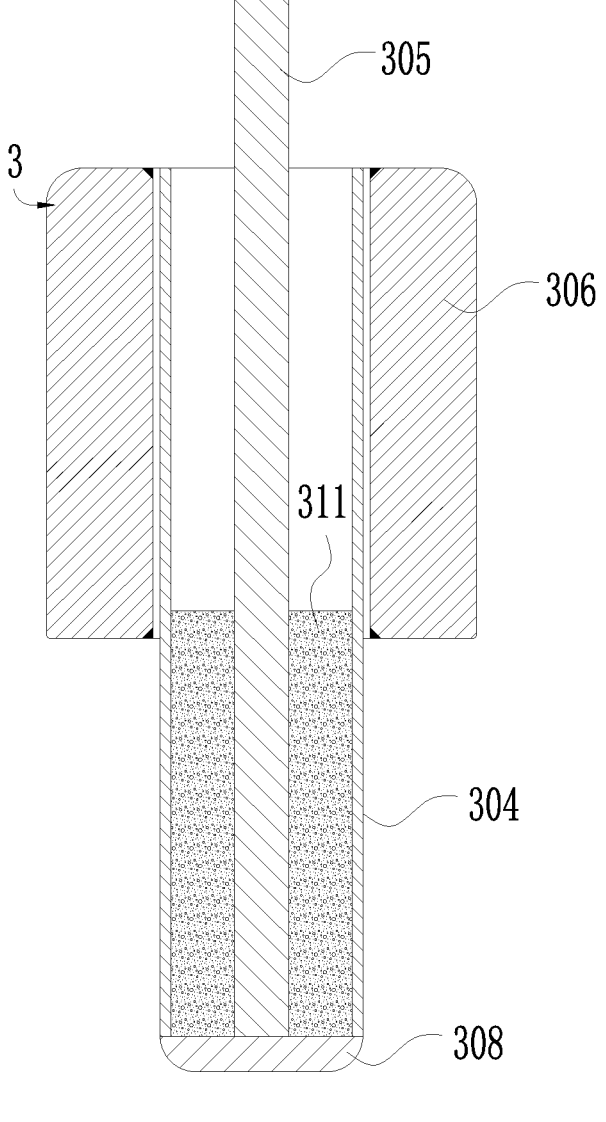
FIG. 8 is a schematic diagram of the second damping structure in the second form in the embodiment of the present application.

Of course, the present application further proposes a new structure, which can be specifically referred to FIG. 7 and FIG. 8, as follows:

New structure one: refer to FIG. 8, the second damping structure 3 comprises a second rigid tube 304 and a third steel strand 305; a bottom part of the second rigid tube 304 is provided with a sealing bottom plate 308; the third steel strand 305 extends into the second rigid tube 304, and is connected to the second rigid tube 304 by means of a fifth mass block 311; and a fourth mass block 306 is coaxially fixedly connected to an outside of the second rigid tube 304.

Figure 7:
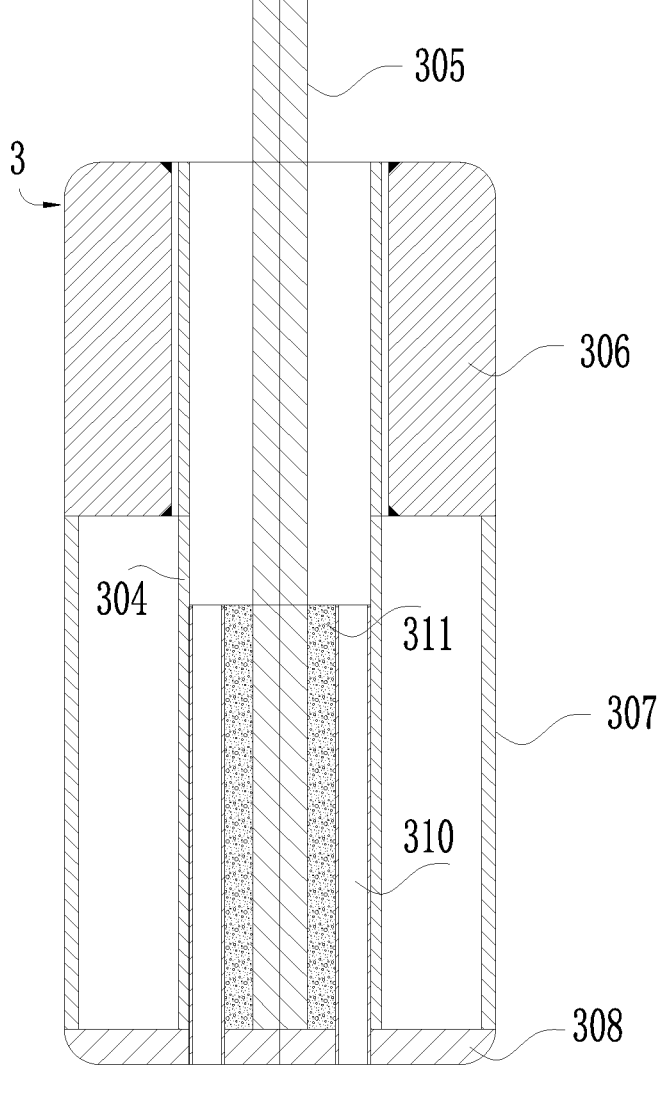
FIG. 7 is a schematic diagram of the second damping structure in the first form in the embodiment of the present application.

New structure two: refer to FIG. 7, the second damping structure 3 comprises a second rigid tube 304 and a third steel strand 305; a bottom part of the second rigid tube 304 is provided with a sealing bottom plate 308; the third steel strand 305 extends into the second rigid tube 304, and is connected to the second rigid tube 304 by means of a fifth mass block 311; and a fourth mass block 306 is coaxially fixedly connected to an outside of the second rigid tube 304; a diameter of the sealing bottom plate 308 is equal to an outer diameter of the fourth mass block 306, and is connected to the bottom part of the fourth mass block 306 by means of a third rigid tube 307.

In the above two ways, the position of the fifth mass block 311 is changed, and the mass ratio of the fifth mass block 311 is changed through changing the mass of the fifth mass block 311. In addition, the fifth mass block 311 is a third casting alloy that connects the second rigid tube 304 and the third steel strand 305 in a casting manner. This structure endows the fifth mass block 311 with a new role, which changes the mass according to the amount of casting. Due to the ease of controlling the amount of casting, compared with the method of directly replacing the entire second damping structure 3 as a whole, when changing the mass ratio, the method of casting can be used to make changes, thus eliminating the need to design a new second damping structure 3.

Further, the fifth mass block 311 is provided with several water holes 310 arranged along the length direction of the third steel strand 305; and the bottom part of the water hole 310 is pierced with a sealing bottom plate 308, which makes the second damping structure 3 have the function of draining water and avoids the corrosion effect caused by rainwater not being discharged.

The present application further proposes a design method for a multi-directional broadband tuned mass damper, which comprises the following steps:

obtaining the target range of the control frequency, and obtaining a plurality of target control main frequencies;

comparing the plurality of the target control main frequencies with a set control main frequency; if the target control main frequency is less than the set control main frequency, taking the target control main frequency as a design parameter of the first damping structure 2; otherwise taking as a design parameter of the second damping structure 3;

obtaining the number of the target control main frequency that is less than the set control main frequency; obtaining the number of the target control main frequency that is larger than or equal to the set control main frequency; and manufacturing the first damping structure 2 and the second damping structure 3 based on the design parameter and number of the first damping structure 2 and the design parameter and number of the second damping structure 3, and installing on the rigid vibration damping frame 1.

Figure 4:
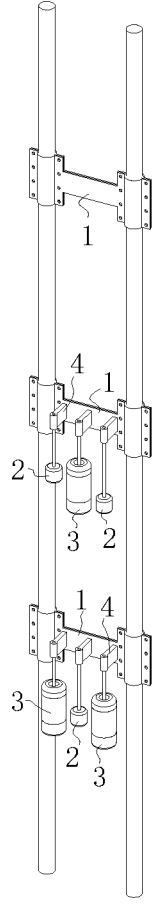
FIG. 4 is a schematic diagram of a connection between a multi-directional broadband tuned mass damper and a sling in the embodiment of the present application.

When the installation space on a single rigid vibration damping frame 1 is less than the required installation space for all the first damping structures 2 and second damping structures 3, a plurality of identical rigid vibration damping frames 1 are additionally installed to install all the first damping structures 2 and second damping structures 3 on the sling. It can be understood that the distance between two slings is limited, resulting in a limited length of the rigid vibration damping frame 1, and it is impossible to install all the first damping structures 2 and the second damping structures 3. Therefore, the remaining first damping structures 2 and the second damping structures 3 can be installed with the same rigid vibration damping frame 1, as shown in FIG. 4.

The structure and design method above are given below to design a structure suitable for realizing broadband control of the sling of the Longmen Bridge. Refer to the following instructions:

In order to achieve broadband vibration damping of the long sling, taking a long sling with a fundamental frequency of 1 Hz as an example, the low-order vibration mode (1.0, 2.0, 3.0 Hz) selects three TMDs corresponding to the main frequency (1.0, 2.0, 3.0 Hz), small mass ratio ($\mu s$=0.1%), and small damping ratio ($\xi Ts$=2%) for one-to-one control. The high-order vibration mode (4 Hz and above) adopt six large mass ratios ($\mu b$=0.5%) and large damping ratios ($\xi Tb$=10%) for coordinated control, and the corresponding control main frequencies are 4.5, 7.0, 10.0, 14.0, 20.0, 27.0 Hz. Take the above control frequencies as design parameters.

The corresponding number of the first damping structures 2 is three, and the number of the second damping structures 3 is three, and simulation models of the first damping structures 2 and the second damping structures 3 are established based on design parameters and numbers. The mass block layout and the size of the steel strand are adjusted to achieve the adjustment of the PTMD control frequency, and then whether the control main frequency meets the requirements is verified. After meeting the requirements, actual manufacturing is carried out.

Figure 11:
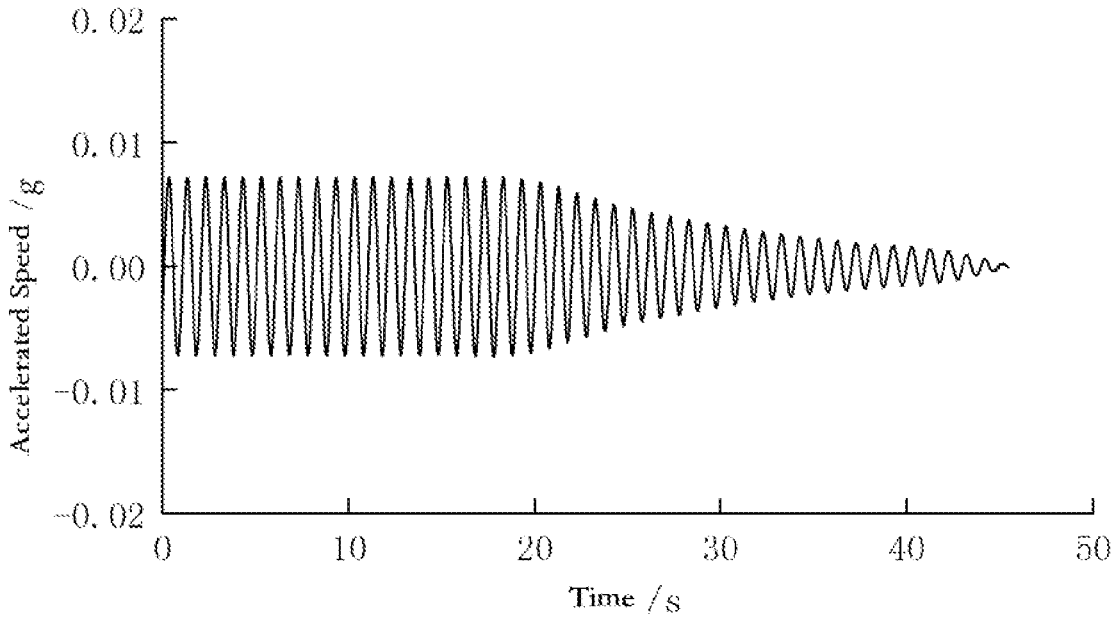
FIG. 11 is a time history curve of free attenuation vibration of a mass block of the first damping structure in the embodiment of the present application.
Figure 12:
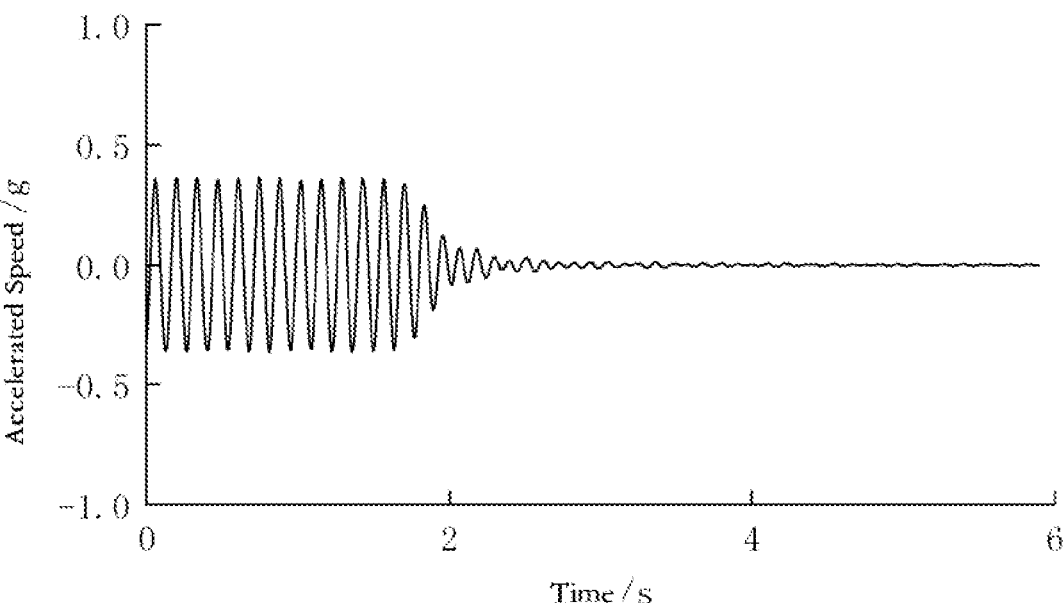
FIG. 12 is a time history curve of free attenuation vibration of a mass block of the second damping structure in the embodiment of the present application.
Figure 13:
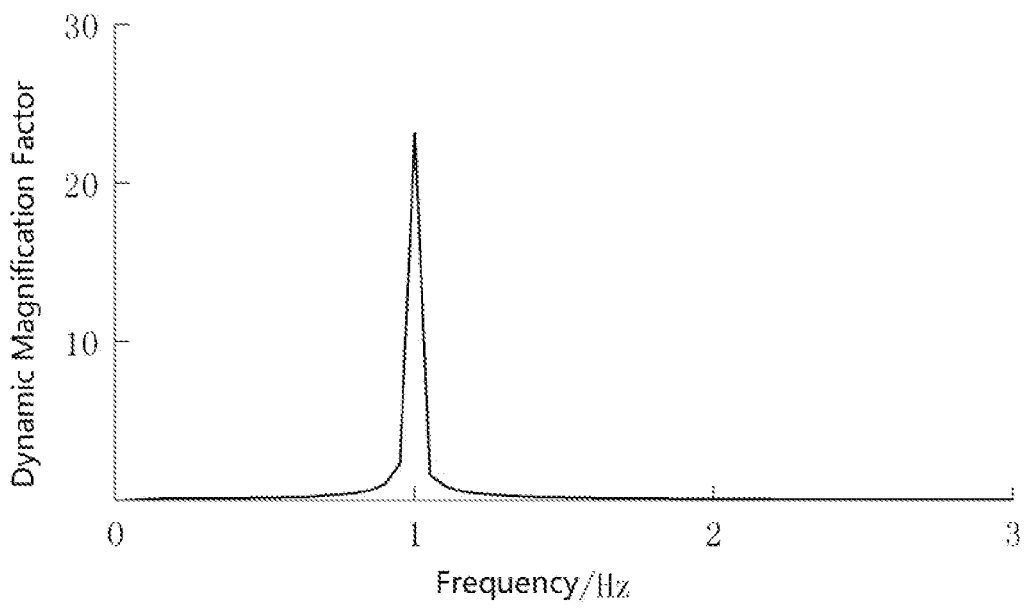
FIG. 13 is a schematic diagram of a dynamic magnification factor of a mass block of the first damping structure in the embodiment of the present application.
Figure 14:
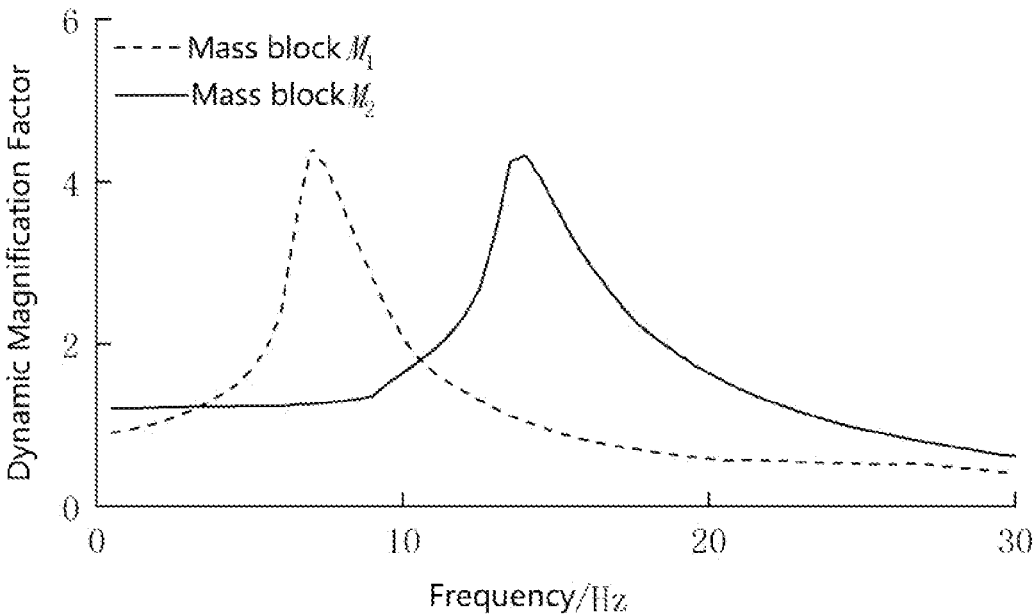
FIG. 14 is a schematic diagram of a dynamic magnification factor of a mass block of the second damping structure in the embodiment of the present application.

Simulation tests are performed after the actual manufacture; in order to achieve the characteristics of the small damping ratio and large damping ratio of PTMD, a 7*φ4 mm (nominal diameter of 12 mm) galvanized steel strand for designing low-order single-frequency PTMD with small damping ratio and small mass ratio and a 19*φ3.2 mm (nominal diameter of 16 mm) galvanized steel strand for designing high-order dual-frequency with large damping ratio and large mass ratio PTMD are respectively adopted. The steel strands are fixed on a 1 t electric vibrator through a movable fixture (convenient to adjust the length of the steel strand and adjust the frequency), and acceleration sensors are arranged at the center of gravity of the hammer head, the center of gravity of the annular mass block and the end of the vibrator to test the vibration characteristics. The time history curves of the free attenuation vibration of the PTMD mass block of 7*φ4 mm and 19*φ3.2 mm galvanized steel strands and the dynamic magnification factors of the PTMD at different frequencies are tested respectively, and the results are shown in FIG. 11 and FIG. 12, in which the damping ratio can be further calculated according to the time history curve of the free damping vibration. It can be seen from FIGS. 11-14 that the damping ratio of the PTMD of 7-wire steel strands is 2%; the damping ratio of the PTMD of the 19-wire steel strand is 10%, and it has two control main frequencies, which are 7.0 Hz and 14.0 Hz respectively. The control frequency range with a dynamic magnification factor greater than 2 reaches 80%~130% of the control main frequency, which can achieve broadband vibration control of the sling.

Figure 3:
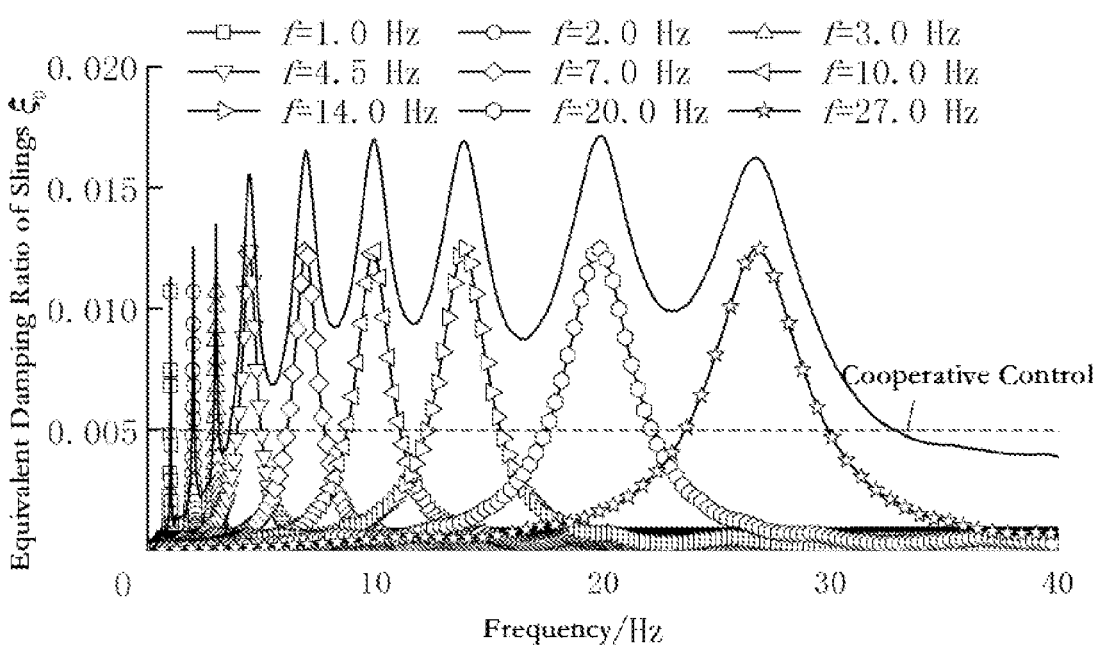
FIG. 3 is a schematic diagram of realizing a goal of 0-30 Hz full-mode vibration damping of a sling under a synergy effect between the first damping structure and the second damping structure in the embodiment of the present application.

In addition, as shown in FIG. 3, through the synergistic effect of three first damping structures 2 and three second damping structures 3, it has 3 TMDs with small damping ratios and small mass ratios and 6 TMDs with large damping ratios and large mass ratios, which can achieve the goal of 0-30 Hz full-mode vibration damping of the sling.

Above, the feasibility is verified by numerical methods and model tests. On the basis of strengthening the original rigid vibration damping frame, the Longmen Bridge adopts a vibration reduction scheme in which a plurality of PTMDs are discretely arranged on the rigid vibration damping frame, and the rigid connection of the rigid vibration damping frame and the PTMD tuning vibration reduction function are integrated to achieve broadband damping and vibration reduction of the long sling of the bridge. It can also be understood from the above that the original rigid vibration damping frame can also be strengthened, such as thickening the thickness of the splint of the rigid vibration damping frame, and lengthening the clamping length at both ends of the splint; and the PTMDs with different control main frequencies are scattered and arranged on the rigid vibration damping frame according to the principle of maximum participation of vibration modes.

The above technologies can be promoted and applied to stay cables, as well as vibration control of slender components such as arch bridge suspenders, lampposts, ultra-long transmission lines, high-speed railway catenary, and vertical vibration control such as pedestrian bridges and highway beam bridges, and lateral vibration control such as heavy-duty railway beam bridges and fan towers.

In the description of the present application, it should be noted that the orientation or positional relationship indicated by the terms "upper", "lower", etc. are based on the orientation or positional relationship shown in the drawings, which is only for the convenience of describing the present application and simplifying the description, instead of indicating or implying that the pointed device or element must have a specific orientation, be configured and operated in a specific orientation, therefore it cannot be understood as a limitation of the present application. Unless otherwise clearly specified and limited, the terms "installation", "connected", and "connection" should be understood in a broad sense. For example, it can be a fixed connection, a detachable connection, or an integral connection; further it can be a mechanical connection, or an electrical connection; further it can be directly connected, or indirectly connected through an intermediate medium, or can be the internal communication between two components. For those of ordinary skill in the art, the specific meanings of the above-mentioned terms in the present application can be understood according to specific circumstances.

It should be noted that relational terms such as "first" and "second" are only for distinguishing one entity or operation from another entity or operation in the present application, and do not necessarily require or imply any such actual relationship or order between these entities or operations. Moreover, the terms "include", "comprise", or any other variants thereof are intended to cover non-exclusive inclusion, so that a process, method, article, or device comprising a series of elements not only comprises those elements, but also comprises those that are not explicitly listed, or further comprises elements inherent to the process, method, article, or device. If there are no more restrictions, the elements defined by the sentence "comprising a . . . " does not exclude the existence of other same elements in the process, method, article, or device comprising the elements.

The above-mentioned are only the embodiments of the present application, so that those skilled in the art can understand or implement the present application. For those skilled in the art, various modifications to these embodiments will be obvious, and the general principles defined herein can be implemented in other embodiments without departing from the spirit or scope of the present application. Therefore, the present application will not be limited to the embodiments shown in this document, but will be subject to the widest scope consistent with the principles and novel features applied herein.

The invention claimed is:

1. A multi-directional broadband tuned mass damper, comprising: a rigid vibration damping frame (1), and two ends of the rigid vibration damping frame (1) in a length direction are configured to connect to a sling, wherein the rigid vibration damping frame (1) is provided with at least one first damping structures (2) and at least one second damping structures (3) distributed along the length direction at intervals, and an extension direction of the at least one first damping structure (2) is the same as that of an extension direction of the at least one second damping structure (3);

wherein the at least one first damping structures (2) is provided with a control main frequency; the at least one second damping structures (3) is provided with two control main frequencies; and the control main frequencies of the at least one second damping structure (3) is higher than each control main frequency of the at least one first damping structure (2);

wherein the at least one first damping structure (2) comprises a first steel strand (200) and a first mass block (201); one end of the first steel strand (200) is connected to the rigid vibration damping frame (1) by means of a connecting block (4), and the other end is connected to the first mass block (201); and a formula of the control main frequency of the at least one first damping structure (2) is:

$$f_1 = (K/M)^{1/2}/2\pi,$$

wherein K is a stiffness of the first steel strand (200), and M is a mass of the first mass block (201);

wherein the first mass block (201) is provided with a first casting hole, and a part of the first steel strand (200) extending into the first casting hole is connected to the first mass block (201) by means of a first casting alloy in a casting manner.

2. The multi-directional broadband tuned mass damper according to claim 1, wherein there are a plurality of the first damping structures (2) and a plurality of the second damping structures (3); and the control main frequencies of the plurality of the first damping structures (2) are different; and the two control main frequencies of each second damping structure (3) are different, and the two control main frequencies of the plurality of second damping structures (3) are different.

3. The multi-directional broadband tuned mass damper according to claim 2, wherein one second damping structure (3) is provided between two adjacent first damping structures (2); or the rigid vibration damping frame (1) is provided with a first area and a second area in the length direction, all the first damping structures (2) are arranged in the first area, and all the second damping structures (3) are arranged in the second area.

4. The multi-directional broadband tuned mass damper according to claim 1, wherein the at least one first damping structures (2) and the at least one second damping structures (3) are arranged on the rigid vibration damping frame (1) according to the control main frequencies from large to small or from small to large.

5. The multi-directional broadband tuned mass damper according to claim 1, wherein the at least one second damping structure (3) comprises a second steel strand (303), a second mass block (300), a first rigid tube (301) and a third mass block (302);

the second mass block (300) is coaxially connected to the third mass block (302) by means of the first rigid tube (301); a via hole is provided on the second mass block (300); one end of the second steel strand (303) is connected to the third mass block (302) through the via hole, and the other end is connected to the rigid vibration damping frame (1) by means of a connecting block (4); and formulas of the two control main frequencies of the at least one second damping structure (3) are:

$$f_2 = [K/(M_1 + M_2 + M_3)]^{1/2}/2\pi;$$

$$f_3 = (T/M_2)^{1/2}/2\pi;$$

wherein K is a stiffness of the second steel strand (303), $M_1$ is a mass of the third mass block (302), and $M_2$ is a mass of the second mass block (300); and $M_3$ is a mass of the first rigid tube (301).

6. The multi-directional broadband tuned mass damper according to claim 5, wherein the third mass block (302) is provided with a second casting hole; and the part of the second steel strand (303) located in the second casting hole is connected to the third mass block (302) by means of a second casting alloy (309).

7. A design method for the multi-directional broadband tuned mass damper according to claim 1, comprising:

obtaining a target range of the control frequency, and obtaining a plurality of target control main frequencies;

comparing the plurality of the target control main frequencies with a set control main frequency; if the target control main frequency is less than the set control main frequency, taking the target control main frequency as a design parameter of the first damping structure (2); otherwise taking as a design parameter of the second damping structure (3);

obtaining the number of the target control main frequency that is less than the set control main frequency; obtaining the number of the target control main frequency that is larger than or equal to the set control main frequency; and manufacturing the first damping structure (2) and the second damping structure (3) based on the design parameter and number of the first damping structure (2) and the design parameter and number of the second damping structure (3), and installing on the rigid vibration damping frame (1).

8. The design method for the multi-directional broadband tuned mass damper according to claim 7, wherein when the installation space on a single rigid vibration damping frame (1) is less than a required installation space for all the first damping structures (2) and second damping structures (3), a plurality of identical rigid vibration damping frames (1) are additionally installed to install all the first damping structures (2) and second damping structures (3) on the sling.

9. A multi-directional broadband tuned mass damper comprising: a rigid vibration damping frame (1), and two ends of the rigid vibration damping frame (1) in a length direction are configured to connect to a sling, wherein the rigid vibration damping frame (1) is provided with at least one first damping structure (2) and at least one second damping structure (3) distributed along the length direction at intervals, and an extension direction of the at least one first damping structure (2) is the same as that of an extension direction of the at least one second damping structure (3);

wherein the at least one first damping structure (2) is provided with a control main frequency; the at least one second damping structure (3) is provided with two control main frequencies; and the control main frequencies of the at least one second damping structure (3) are higher than each control main frequency of the at least one first damping structure (2);

wherein the at least one second damping structure (3) comprises a second rigid tube (304) and a third steel strand (305); a bottom part of the second rigid tube (304) is provided with a sealing bottom plate (308); and wherein the third steel strand (305) extends into the second rigid tube (304), and is connected to the second rigid tube (304) by means of a fifth mass block (311); and a fourth mass block (306) is coaxially fixedly connected to an outside of the second rigid tube (304).

10. The multi-directional broadband tuned mass damper according to claim 9, wherein the fifth mass block (311) is provided with several water holes (310) arranged along the length direction of the third steel strand (305); and the bottom part of the water hole (310) passes through the sealing bottom plate (308).

11. A multi-directional broadband tuned mass damper comprising: a rigid vibration damping frame (1), and two ends of the rigid vibration damping frame (1) in a length direction are configured to connect to a sling, wherein the rigid vibration damping frame (1) is provided with at least one first damping structure (2) and at least one second damping structure (3) distributed along the length direction at intervals, and an extension direction of the at least one first damping structure (2) is the same as that of an extension direction of the at least one second damping structure (3);

wherein the at least one first damping structure (2) is provided with a control main frequency; the at least one second damping structure (3) is provided with two control main frequencies; and the control main frequencies of the at least one second damping structure (3) are higher than each control main frequency of the at least one first damping structure (2);

wherein the at least one second damping structure (3) comprises a second rigid tube (304) and a third steel strand (305); a bottom part of the second rigid tube (304) is provided with a sealing bottom plate (308); and wherein the third steel strand (305) extends into the second rigid tube (304), and is connected to the second rigid tube (304) by means of a fifth mass block (311); and a fourth mass block (306) is coaxially fixedly connected to an outside of the second rigid tube (304); and a diameter of the sealing bottom plate (308) is equal to an outer diameter of the fourth mass block (306), and is connected to a bottom part of the fourth mass block (306) by means of a third rigid tube (307).

12. The multi-directional broadband tuned mass damper according to claim 10, wherein the fifth mass block (311) is a third casting alloy that connects the second rigid tube (304) and the third steel strand (305) in a casting manner.

* * * * *